United States Patent Office 3,728,310
Patented Apr. 17, 1973

3,728,310
MIXED POLYAMINES FORMED BY THE ACID-CATALYZED CONDENSATION OF 3-CHLOROANILINE, 2,5-DICHLOROANILINE, AND FORMALDEHYDE AS CURING AGENTS FOR POLYURETHANES
Norman K. Sundholm, Middlebury, and Ivan Mankowich, Cheshire, Conn., assignors to Uniroyal, Inc., New York, N.Y.
No Drawing. Filed Oct. 12, 1970, Ser. No. 80,237
Int. Cl. C08g 22/16
U.S. Cl. 260—75 NH     2 Claims

ABSTRACT OF THE DISCLOSURE

The mixtures of polyamines formed by the acid-catalyzed condensation of 3-chloroaniline, 2,5-dichloroaniline, and formaldehyde in certain ratios have improved properties for curing polyurethanes. They are readily blended with the liquid polyurethane because they are liquid or have low solidification points.

BACKGROUND OF THE INVENTION

(1) Field of the invention

This invention relates to new polyamines and mixtures of polyamines and to a method of making such polyamines, as well as to a method of curing polyurethanes with said polyamines, and cured polyurethanes so obtained.

(2) Description of the prior art

The use of 4,4'-methylenebis(2-chloroaniline), called "MOCA," as a curing agent for polyurethanes is well known, but unfortunately this substance is high-melting and consequently involves certain processing disadvantages.

Mixed diamine curing agents for polyurethanes are known, as disclosed for example in U.S. Pat. 3,194,793, issued to Kogon (assigned to Du Pont) on July 13, 1965, which shows mixtures of at least one aromatic secondary diamine whose secondary amino groups have one valence of each nitrogen atom attached to an aromatic ring and another valence attached to an aliphatic carbon atom. Mixed diamine curing agents of this type cannot be considered to be replacements for 4,4'-methylenebis(2-chloroaniline) because they produce cured polyurethane stocks of much lower hardness. In contrast, the mixtures of polyamines of the present invention produce cured stocks having higher hardness, almost equivalent to that given by 4,4'-methylenebis(2-chloroaniline).

U.S. Pats. 3,379,691, issued Apr. 23, 1968, and 3,408,301, issued Oct. 29, 1968, to Norman K. Sundholm, disclose the use of acid-catalyzed condensation products of 2-chloroaniline, 2,5-dichloroaniline, and formaldehyde as curing agents for polyurethanes. Replacement of the 2-chloroaniline by 3-chloroaniline in accordance with the present invention results in curing agents which have more liquid properties, i.e., are liquids at ambient temperature or have low solidification points.

U.S. Pat. 3,412,071, issued Nov. 19, 1968, to Norman K. Sundholm, discloses the use of acid-catalyzed condensation products of aniline, 2-chloroaniline, and formaldehyde as curing agents for polyurethanes. By application of the present invention, products can be made that have longer pot lives than the condensation products of that patent and have good supercooling properties.

Copending application Ser. No. 796,459 of Norman K. Sundholm, filed Feb. 4, 1969, is directed to the use of acid-catalyzed condensation products of certain N-alkylanilines, 2-chloroaniline, and formaldehyde as curing agents for polyurethanes. The present products represent a remarkable improvement in that they produce higher hardness when used to cure a polyurethane.

SUMMARY OF THE INVENTION

The invention is based on the discovery that certain mixtures of 3-chloroaniline and 2,5-dichloroaniline may be reacted with formaldehyde in the presence of an acid to provide mixtures of polyamines which are effective curing agents for polyurethanes and which display unexpected and valuable properties. Many of them are liquid; those which are not liquid have, on melting and cooling, solidification points lower than that of 4,4'-methylenebis(2-chloroaniline).

As is well known, one means for curing polyurethanes is by the use of certain aromatic diamines. Generally in this method the diamine is added as a liquid to the liquid polyurethane to facilitate the blending operation. So that high temperatures are not necessary in this operation, it is advantageous that the diamine be a liquid, a low-melting solid, or a solid which when melted exhibits good supercooling properties. If the diamine solidifies before it is completely blended into the polymer or crystallizes from the blend, an improper cure will be obtained.

There has been a need for a diamine which has a lower solidification point than that of the favored curing agent, 4,4'-methylenebis(2-chloroaniline). Commercial samples of this diamine melt in the range 99–109° C. and solidify in the range 85–99° C. The present condensation products fulfill this need.

DETAILED DESCRIPTION

As indicated, the inventon is concerned with new chemical compositions which are curing agents for polyurethanes, particularly isocyanate-terminated polyurethanes. Such polyurethanes are usually prepared by reacting an excess of an organic diisocyanate with a long-chain glycol. Generally the glycols used are polyether glycols or polyester glycols. The molar ratio of diisocyanate to glycol should be greater than one and is preferably large enough so that the polyurethane is liquid. Such polyurethanes are generally called prepolymers.

Curing agents for these prepolymers are compounds which contain more than one active hydrogen-containing group capable of adding to the isocyanate group. Glycols and diamines are such compounds. The plurality of the addition reactions results in chain extension. When a diamine is used as the curing agent chain extension is effected through formation of substituted urea linkages. By use of a deficiency of diamine, isocyanate groups remain. These react at curing temperature with active hydrogen-containing groups, e.g., urea and urethane groups, in the polymer chain to give branch points, biuret and allophanate linkages, respectively, which result in crosslinks. When a glycol is used as the curing agent, only urethane and allophanate groups are formed. See pp. 301–6, Polyurethanes: Chemistry and Technology, part II, Technology, by J. H. Saunders and K. C. Frisch, Interscience Publishers, 1964, for a description of the chemical reactions involved in the curing action.

The diamines are preferred over the glycols as curing agents since they react faster and thus have shorter cure times, and generally give better properties, such as higher tensile strength and higher hardness, after curing. Aromatic diamines are the most common, since most aliphatic diamines react too fast. A favored curing agent of this type is 4,4'-methylenebis(2-chloroaniline).

It is advantageous that the temperature of mixing of the diamine curing agent with the polyurethane is as low as possible, so the pot life of the mixture is as long as possible and the properties of the polymer are not affected.

In commercial practice the diamine is usually mixed as a liquid with the liquid polyurethane so as to have quick, complete, and facile mixing. If the diamine is a solid, it is melted before mixing; the lower the solidification point, the lower the mixing temperature that can be used. The ideal diamine is one which is a liquid at ambient temperature.

There are some applications for which the conventionally used 4,4′ - methylenebis(2 - chloroaniline) melts high. The melted material has to be kept at an undesirably high temperature to remain liquid for extended periods, and when added to the polyurethane, which is at a lower temperature, tends to solidify before it is completely blended into the polymer or crystallize from the blend. Such premature solidification of the diamine results in polymer-diamine mixes which do not cure properly.

The present invention is based on the discovery that certain mixtures of 3 - chloroaniline and 2,5 - dichloroaniline may be reacted with formaldehyde in the presence of an acid to provide new and useful compositions which are effective curing agents for polyurethanes. The new compositions display unexpected and valuable properties, in comparison to heretofore available diamine curing agents. Many of them are liquid. When a solid composition of the invention is heated to a temperature at which it is liquid, it can thereafter be cooled to a temperature much lower than the temperature at which it was melted, without tending to resolidify readily. These properties permit the ready blending of the curing agents of this invention with a polyurethane without excessively heating the blend to prevent solidification of the curing agent. Of the products of this invention prepared the highest solidification temperature is 78° C. Commercial samples of the conventional 4,4′-methylenebis(2-chloroaniline), in contrast, resolidify in the range 85–99° C.; they melt in the range 99–109° C.

Another outstanding advantage of the present invention is that curing agents can be provided which have pot lives equal to or longer than that of 4,4′-methylenebis(2-chloroaniline). The pot life is dependent upon the molar ratio of 3-chloroaniline to 2,5-dichloroaniline and also upon the molar ratio of the sum of the two amines to formaldehyde. The lower the processing temperature, the longer the pot life; because the curing agents of this invention permit lower processing temperatures, blends of them with a polyurethane may exhibit even longer pot lives. Because the present curing agents are liquid or have low solidification points there is no or less likelihood that they will solidify in and plug up the lines that carry them to the mixer.

The preferred compositions having useful curing activity and either being liquid or showing good supercooling properties are those prepared by condensing formaldehyde, or formaldehyde-generating reagent, in the presence of an acid with mixtures of 3-chloroaniline and 2,5-dichloroaniline in which the molar ratio of 3-chloroaniline to 2,5-dichloroaniline is in the range 1:1 to 3:1. Products from mixtures richer in 2,5-dichloroaniline have solidification points higher than that of 4,4′-methylenebis (2-chloroaniline), while those from mixtures richer in 3-chloroaniline have pot lives too short for practical use.

The amount of formaldehyde, or formaldehyde-generating reagent, used should be such that the molar ratio of the sum of the two amines to formaldehyde is at least about 1.5:1, that is, about 1.5:1 or higher (e.g., 4:1, 5:1, 10:1, or more). Unreacted monoamines are removed from the condensation products by vacuum or steam distillation.

The condensations are carried out in inert solvents. The lower alcohols, such as methanol, ethanol, the propanols, and the butanols, are preferred; but water, ethers, lower aliphatic acids, aromatic hydrocarbons, etc., are also suitable.

The condensation is promoted by acids; it is preferred to use one of the strong mineral acids such as hydrochloric or sulfuric, but other inorganic or organic acids may be used such as phosphoric, p-toluenesulfonic, oxalic, dichloroacetic, and trichloroacetic. It is preferred to use about one equivalent of acid per mole of total amines; however, this is not necessary. The useful amounts of acid are usually in the range from 0.5 to 2 equivalents per mole of total amines, but 0.1 to 10 equivalents may be used.

The condensations are best carried out at moderately increased temperatures; the preferred temperature range is 50–100° C., although lower and higher temperatures may be used (e.g., 20–150° C.).

Some of the compositions have been examined by gas-liquid chromatography, which shows the presence of three characterized components, 4,4′-methylenebis(3-chloroaniline) (I), 2,5,3′ - trichloro - 4,4′ - methylenedianiline (II), and 4,4′-methylenebis(2,5-dichloroaniline) (III). The presence of a small amount of another component, probably an isomer of I, is also shown.

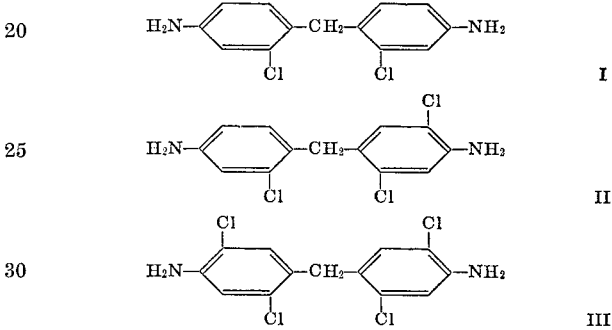

Distillation of the diamines in these compositions under reduced pressure leaves a residue which is obviously a complex mixture of higher polyamines, e.g., triamines, tetramines, etc. The amount of this mixture of higher polyamines present is dependent primarily upon the molar ratio of the sum of the two amines to formaldehyde used; the smaller the ratio, the greater the amount of polymeric residue.

EXAMPLE I

The preparation of one of the curing agents of this invention, in which the molar ratio of 3-chloroaniline to 2,5-dichloroaniline is 2:1 and the molar ratio of their sum to formaldehyde is 4:1, is given as an example:

To a stirred solution of 169.6 grams (1.33 moles) of 3-chloroaniline, 108.5 grams (0.67 mole) of 2,5-dichloroaniline, and 166.7 ml. (2.0 moles) of concentrated hydrochloric acid in 1 liter of ethanol at 70° C. was added 40.5 grams (0.50 mole) of 37% formaldehyde during 30 minutes. The stirred solution was heated for one hour at 70° C., and then 800 ml. of ethanol distilled during three hours. One liter of water and 180 grams of 28–30% aqueous ammonia were added. The organic layer was separated, washed with water, and subjected to steam distillation to remove excess monoamines. The residue was dissolved in about 150 ml. of toluene, the solution separated from the water layer, and the toluene and small amount of water removed by evaporation under reduced pressure in a rotary evaporator on a steam bath. The product consisted of 132.0 grams of brown oil, which slowly partially crystallized on standing many days at room temperature. On melting, this mixture clears at 105° C.

Examination of this product by vacuum distillation and gas-liquid chromatography showed it to consist of approximately 17% 4,4′-methylenebis(3-chloroaniline), 44% 2,5,3′-trichloro-4,4′-methylenedianiline, 17% 4,4′-methylenebis(2,5-dichloroaniline), 2% of an unknown (most likely a diamine), and 20% of mixed higher polyamines.

The presence of the 2,5,3′-trichloro-4,4′-methylenedianiline (also named 2,5,2′-trichloro-4,4′-diaminodiphenylmethane) in these products was established by its isolation and characterization in one instance. Using the procedure given above for the preparation of one of the products of this invention, 1 mole of formaldehyde was reacted with a mixture of 1.33 moles of 3-chloroaniline and 2.67 moles of 2,5-dichloroaniline in the presence of 4 moles of hydrochloric acid. Experimentation has shown that 4,4'-methylenebis(3-chloroaniline) is soluble and 4,4'-methylenebis(2,5-dichloroaniline) is insoluble in 20% chloroacetic acid. This is evidently due to the greater effect of the two chlorine atoms substituted on the same benzene ring in the 2 and 5 positions over one chlorine atom in the 3 position in reducing the basicity of the amino group on a benzene ring. Since the new trichloro compound contains one amino group on a benzene ring substituted with but one chlorine atom in the 3 position, it is soluble in 20% chloroacetic acid. To separate the new compound, 154 grams of this product was dissolved in 550 ml. of hot toluene. The crystals which separated on cooling were collected by filtration and washed with 200 ml. of toluene; they weighed 60 grams and on the basis of melting point were evidently crude 4,4'-methylenebis(2,5-dichloroaniline). The combined washing and filtrate was extracted with 60 100-ml. portions of 20% chloroacetic acid. The extracts were made alkaline with excess aqueous ammonia. The products separated as oils which gradually solidified. They were collected, dried, and dissolved in the smallest amount of warm chloroform. This solution was chromatographed on an alumina column using chloroform as eluant liquid. Twenty-seven 125-ml. fractions were collected. Evaporation of the chloroform left an amorphous residue. Trituration of the 16th–27th fractions with a small amount of ethanol gave a solid. These fractions were combined and rechromatographed twice in a similar manner. The product obtained was recrystallized from ethanol to give 2 grams of colorless crystals melting at 99–100° C. In gas-liquid chromatography it has the same retention time as the component in the condensation products having the intermediate retention time. Elemental analysis and the infrared spectrum are consistent with the trichloro compound.

*Analysis.*—Calculated for $C_{13}H_{11}Cl_3N_2$ (percent): C, 51.74; H, 3.65; Cl, 35.32; N, 9.29. Found (percent): C, 51.38; H, 3.59; Cl, 35.06; N, 9.05.

It is believed that it is due to the presence of this trichloro compound in the products of this invention that they have such good properties, i.e., low melting point, high degree of supercooling, and satisfactory pot life. For example, the properties of the product obtained by condensing 3-chloroaniline, 2,5-dichloroaniline, and formaldehyde in the molar ratio 2:1:0.75 have been compared with the properties of the 2:1 molar ratio mixture of 4,4'-methylenebis(3-chloroaniline) and 4,4'-methylenebis(2,5-dichloroaniline). The product of this invention when melted clears at 105° C.; it supercools to room temperature and begins to crystallize at room temperature only after many days' standing. A blend of it with a commercial prepolymer has a pot life of 7 minutes at 100° C. The mixture of the dichloro and tetrachloro diamines when melted clears at 135° C. and supercools to only 103° C.; it has a pot life of but 1½ minutes at 100° C., which is too short for successful application. As a result, the properties of the cured polyurethane were poor.

It is a marked advantage of the 2,5,3'-trichloro-4,4'-methylenedianiline of this invention that its melting point of 99–100° C. is so much lower than the 143–144° C. melting point of the 2,5,2'-trichloro-4,4'-methylenedianiline of U.S. Pat. 3,297,758 issued to Hoeschele (assigned to Du Pont) on Jan. 10, 1967. Because of this the trichloro diamine of this invention is more readily melted and blended with a liquid polyurethane than the prior art trichloro diamine.

EXAMPLE II

This example illustrates the manner of use of the mixed polyamines of the invention as curing agents for a liquid isocyanate-terminated polyurethane prepolymer prepared by adding 351.2 grams of 2,4-tolylene diisocyanate to 1000 grams of poly(oxytetramethylene) glycol (number-average molecular weight 1000) agitated at 40° C. and protected from atmospheric moisture. The mixture was then heated at 80° C. for 2 hours. The prepolymer obtained had an equivalent weight of approximately 665.

A series of curing agents of the invention was prepared using the procedure of Example I and employing, as shown in Table I, various molar ratios of 3-chloroaniline to 2,5-dichloroaniline, M:D, and various molar ratios of total amines to formaldehyde, $(M+D):H_2CO$. Table I also gives the melting (clearing) and solidification points, if any, and the neutralization equivalent (a measure of the ability to react with isocyanate determined by titration with perchloric acid in acetic acid) of the various curing agents.

To evaluate the curing agents, they are weighed out in quantities to provide 0.9 equivalent of amine per isocyanate equivalent using 100 grams of prepolymer. For example, 20.5 grams of the product prepared using a 2:1 molar ratio of 3-chloroaniline to 2,5-dichloroaniline and a 4:1 molar ratio of their sum to formaldehyde and having an equivalent weight of 151.7 is used to cure 100 grams of the prepolymer. The curing agents are heated to 100° C.; those which melt above 100° C. are melted and cooled to 100° C. They are blended with the prepolymer also heated to 100° C. After centrifuging for one hour. The cured sheets are removed and postmold 7 x 7 x 0.075 inches and press-cured at 100° C. for one hour. The cured sheets are removed and postcured for 16 hours at 70° C. The remainder of the blend is kept in an oven at 100° C. and the elapsed time from mixing until the blend becomes unpourable observed; this is the pot life. Physical properties of the cured elastomeric sheets are determined; these are shown in Table I. Properties of the stock cured with 4,4'-methylenebis(2-chloroaniline) are also given.

TABLE I

| Molar ratio, M:D [1] | Molar ratio, $(M+D):H_2CO$ | Melting point, ° C.[2] | Solidification point, ° C.[3] | Neut. equiv. | Pot life at 100° C., min. | Tensile strength, p.s.i. | Elongation, percent | 300% modulus, p.s.i. | Hardness, Shore A/D |
|---|---|---|---|---|---|---|---|---|---|
| 1:1 | 4:1 | 130 | 78 | 156.9 | 16 | 4,600 | 280 | | 91/45 |
| 2:1 | 4:1 | 105 | 25 | 151.7 | 8 | 5,830 | 310 | 5,730 | 88/44 |
| 2:1 | 8:3 | 125 | 56 | 161.0 | 14 | 5,096 | 300 | 5,510 | 94/45 |
| 2:1 | 2:1 | | | 158.9 | 3 | 5,610 | 260 | | 93/49 |
| 3:1 | 4:1 | | | 149.4 | 2 | 5,540 | 310 | 5,280 | 91/44 |
| 3:1 | 8:3 | | | 164.6 | 2½ | 6,670 | 370 | 3,520 | 89/44 |
| 4,4'-methylenebis(2-chloroaniline) technical | | 99–109 | 85–99 | | 8 | 6,190 | 330 | 4,910 | 95/50 |

[1] M denotes 3-chloroaniline; D denotes 2,5-dichloroaniline.
[2] This is the temperature at which the melt clears.
[3] With agitation by scratching.

The data in Table I show that all of the compositions of the invention prepared are either liquid or have solidification points lower than that of technical 4,4'-methylenebis(2-chloroaniline). Although the liquids are very viscous at ambient temperature, they have sufficiently low viscosity at about 60° C. for blending with the prepolymers. Thus there is a temperature range of about 60–85° C. in which all of the curing agents of the invention except those at or near the end of the range where the M:D molar ratio is 1:1 can be employed as fluid liquids, but 4,4'-methylenebis(2-chloroaniline) cannot. This temperature range narrows as the M:D molar ratio approaches 1:1.

The advantage of being able to use a curing agent in the 60-85° C. temperature range is demonstrated by the mixing of the product obtained by condensing 3-chloroaniline, 2,5-dichloroaniline, and formaldehyde in the molar ratio 2:1:0.75 with the above prepolymer, both at 60° C. The pot life of the resultant blend is at least 7 minutes longer than when the mixing is done at 100° C.

The data show that, keeping the (M+D):H$_2$CO molar ratio at 4:1, increasing the M:D molar ratio results in a decrease in melting and solidification points, in neutralization equivalent, and in pot life. This, as would be expected, is due to the increasing amounts of 4,4'-methylenebis(3-chloroaniline) and decreasing amounts of 4,4'-methylenebis(2,5 - dichloroaniline) present in the products, as shown by gas-liquid chromatographic analysis. The former compound has a lower melting point, lower neutralization equivalent, and much shorter pot life than the latter compound.

It will be understood that the invention is applicable to the curing of conventional polyurethane prepolymers in general. As is well known to those skilled in the art such materials are produced from an organic compound rich in hydroxy groups, usually a polymer having at least two terminal hydroxy groups, frequently a polyether or polyester, and an organic polyisocyanate, usually a diisocyanate. The polymer used for reaction with the polyisocyanate to make the polyurethane is frequently a polyether or polyester glycol having a molecular weight of from 400 to 6000, preferably in the 1000-2000 range. Mention may be made of chain extended polyesters made from a glycol (e.g., ethylene and/or propylene glycol) and a saturated dicarboxylic acid (e.g., adipic acid). Usually the starting glycol contains from 2 to 20 carbon atoms and the acid contains from 4 to 12 carbon atoms. Poly(ethylene adipate), poly(ethylene adipate-phthalate), poly(neopentyl sebacate), etc. may be mentioned. Small amounts of triols such as trimethylolpropane or trimethylolethane may be included. Examples of polyether glycols are poly(oxypropylene) glycol, poly(oxypropylene-oxyethylene) glycol, and poly(oxytetramethylene) glycol. Among the suitable polyisocyanates may be mentioned 2,4-tolylene diisocyanate, 80/20 and 65/35 mixtures of 2,4- and 2,6-tolylene diisocyanates, 4,4'-diphenylmethane diisocyanate, 4,4'-biphenyl diisocyanate, 3,3'-dimethyl (or dimethoxy)-4,4'-biphenyl diisocyanate, 1,5-naphthalene diisocyanate, m- and p-phenylene diisocyanates, 1,6-hexamethylene diisocyanate, etc. The isocyanate is of course used in amount at least equivalent to the hydroxy groups in the starting polymer; larger quantities of diisocyanate favor formation of liquid prepolymer. Generally the molar ratio of diisocyanate to glycol is in the 1.2:1 to 3:1 range. For additional examples of suitable starting materials for making polyurethanes, reference may be had to the following: Otto Bayer in Angewandte Chemie, A59, 257 (1947) and U.S. Pat. 3,105,062, Graham and Gregg, Sept. 24, 1963. It will be understood that the present compositions may be used in the same proportions and under the same curing conditions as conventional diamine curing agents. Almost invariably the proportions of curing agent to prepolymer are such as to provide from about 0.5 to about 1.1 equivalents of amine per isocyanate equivalent in the prepolymer. The curing agent in the molten state is blended with the liquid prepolymer and is then shaped, for example, cast, molded, spread on cloth or otherwise used to coat and/or impregnate. While in the desired shape the mixture is heated to expedite cure, for example, to a temperature of 50-250° C. for ½-48 hours (time and temperature of cure being generally inversely related) depending on such factors as the particular prepolymer used, the amount of curing agent, the degree of cure desired, the size of the article, the character of the heating device, etc. It will be understood that the curing conditions are not critical, but simply follow conventional practice. The curing agent may be employed according to the so-called "green stock" technique, for example, by mixing the curing agent and polyurethane and partially reacting them to a gelled, but incompletely cured, stage; the resulting solid gum (green stock) can subsequently be molded in a desired shape and cured at elevated temperature to a thermoset, cross-linked state.

Useful articles of all sorts, such as gears, wheels, drive belts, conveyor belts, printing rollers, bearings, pump stators and impellers, heel lifts, gaskets, seals, and electric cable jacketing, may be made using the curing agents of the invention.

Having thus described our invention, what we claim and desire to protected by Letters Patent is:

1. The mixtures of polyamines useful for curing isocyanate-terminated polyurethane prepolymers formed by the condensation in an inert solvent at a temperature of from 20° to 150° C. in the presence of an acid of formaldehyde with a mixture of 3-chloroaniline and 2,5-dichloroaniline in which the molar ratio of 3-chloroaniline to 2,5-dichloroaniline is in the range 2:1 to 3:1, the molar ratio of the sum of the two amines to formaldehyde is in the range 2:1 to 4:1, and the amount of acid is from 0.1 to 10 equivalents per mole of total amines, the said mixtures of polyamines being liquid at ambient temperature.

2. The products of an acid-catalyzed condensation of 3-chloroaniline, 2,5-dichloroaniline and formaldehyde in an inert solvent wherein:

the molar ratio of 3-chloroaniline to 2,5-dichloroaniline is in the range 2:1 to 3:1 and the molar ratio of the sum of the two amines to formaldehyde is in the range 2:1 to 4:1; and said acid catalyst is present in amount of from 0.5 to 2 equivalents per mole of total amines and is selected from the group consisting of mineral acids, p-toluenesulfonic acid, oxalic acid, dichloroacetic acid, and trichloroacetic acid; and said condensation is accomplished at temperatures between 50° and 100° C., the said products being liquid at ambient temperature and being useful for curing isocyanate-terminated polyurethane prepolymers.

References Cited

UNITED STATES PATENTS

| | | | |
|---|---|---|---|
| 3,408,301 | 10/1968 | Sundholm | 252—182 |
| 3,412,071 | 11/1968 | Sundholm | 260—75 |
| 3,563,906 | 2/1971 | Hoeschele | 252—182 |

DONALD E. CZAJA, Primary Examiner

H. S. COCKERAM, Assistant Examiner

U.S. Cl. X.R.

252—182; 260—77.5 AM, 570 D